US012606328B2

(12) United States Patent
Osawa

(10) Patent No.: US 12,606,328 B2
(45) Date of Patent: Apr. 21, 2026

(54) UNMANNED FLYING CRAFT

(71) Applicant: Kubota Corporation, Osaka (JP)

(72) Inventor: Ikuo Osawa, Ota (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/246,739

(22) Filed: Jun. 24, 2025

(65) Prior Publication Data

US 2025/0313357 A1      Oct. 9, 2025

Related U.S. Application Data

(63) Continuation of application No. PCT/JP2022/048189, filed on Dec. 27, 2022.

(51) Int. Cl.
| | |
|---|---|
| *B64U 50/33* | (2023.01) |
| *B64U 10/14* | (2023.01) |
| *B64U 20/80* | (2023.01) |
| *B64U 50/19* | (2023.01) |

(52) U.S. Cl.
CPC ............. *B64U 20/80* (2023.01); *B64U 10/14* (2023.01); *B64U 50/19* (2023.01); *B64U 50/33* (2023.01)

(58) Field of Classification Search
CPC ........ B64U 50/19; B64U 50/33; B64U 10/14; B64U 20/80
See application file for complete search history.

(56) References Cited

U.S. PATENT DOCUMENTS

| | | | | |
|---|---|---|---|---|
| 2016/0137304 A1* | 5/2016 | Phan | ..................... | B64C 27/001 |
| | | | | 244/17.23 |
| 2018/0009529 A1 | 1/2018 | Phan et al. | | |
| 2021/0309122 A1* | 10/2021 | Wake | ..................... | B64U 10/14 |
| 2023/0322423 A1* | 10/2023 | Kinoshita | .............. | G05D 1/622 |
| | | | | 701/3 |
| 2024/0343423 A1* | 10/2024 | Ishikawa | ............... | B64U 50/11 |

FOREIGN PATENT DOCUMENTS

| | | |
|---|---|---|
| EP | 2762704 A1 | 8/2014 |
| JP | 5508604 B2 | 6/2014 |
| JP | 2019501057 A | 1/2019 |
| JP | 2021165143 A | 10/2021 |
| JP | 7004369 B1 | 1/2022 |
| JP | 2022104737 A | 7/2022 |

OTHER PUBLICATIONS

International Search Report in PCT/JP2022/048189, mailed Mar. 20, 2023, 2 pages.

* cited by examiner

*Primary Examiner* — Tye William Abell

(74) *Attorney, Agent, or Firm* — Keating & Bennett, LLP

(57) ABSTRACT

An unmanned aerial vehicle includes a power generator, a first electrical component, a second electrical component, a main battery capable of being charged with power generated by the power generator, a sub-battery, and a charging circuit connecting the second electrical component and the sub-battery. The sub-battery is configured to be charged by receiving power from the second electrical component through the charging circuit, and configured to supply power to the first electrical component.

8 Claims, 13 Drawing Sheets

10

| | | |
|---|---|---|
| ROTOR — 22 | IMPLEMENT — 200 | ROTOR — 12 |
| | | MOTOR — 14 |
| POWER SUPPLY — 76 | | ESC — 16 |
| DRIVETRAIN — 27 | POWER BUFFER — 9 | CONTROLLER — 4a    SENSORS — 4b |
| INTERNAL COMBUSTION ENGINE — 7a | ELECTRIC GENERATOR — 8 | COMMUNICATION DEVICE — 4c |
| FUEL TANK — 7b | | GROUND STATION — 6 |

UNMANNED FLYING CRAFT

CROSS REFERENCE TO RELATED APPLICATIONS

This application is a Continuation Application of PCT Application No. PCT/JP2022/048189 filed on Dec. 27, 2022. The entire contents of this application are hereby incorporated herein by reference.

BACKGROUND OF THE INVENTION

1. Field of the Invention

The present disclosure relates to unmanned aerial vehicles.

2. Description of the Related Art

An unmanned aerial vehicle (UAV) is an aircraft that structurally cannot accommodate human occupants and is capable of flight through remote control or autonomous operation. A rotary-wing type unmanned aerial vehicle is a UAV that generates lift using propellers, namely rotary wings, which rotate around an axis. A small unmanned aerial vehicle including multiple rotary wings (Multi-Rotor UAV) is also called a "drone", "multirotor", or "multicopter", and is widely used for applications including aerial photography, surveying, logistics, and agricultural spraying.

Japanese Patent Application Publication No. 2022-104737 describes an unmanned aerial vehicle (unmanned flying body) that changes its flight position in coordination with the operation of an agricultural machine.

SUMMARY OF THE INVENTION

Example embodiments of the present disclosure provide methods for monitoring states of batteries mounted on unmanned aerial vehicles.

In a non-limiting example embodiment of the present disclosure, an unmanned aerial vehicle includes a plurality of rotors, a power generator, a first electrical component, a second electrical component, a main battery configured to be charged by electricity generated by the power generator, a sub-battery, and a charging circuit connecting the second electrical component and the sub-battery. The sub-battery is configured to be charged by receiving power from the second electrical component through the charging circuit, and configured to supply power to the first electrical component.

Example embodiments of the present disclosure provide methods for monitoring states of batteries mounted on unmanned aerial vehicles.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Unmanned aerial vehicles each include a plurality of rotors and a rotation driver to rotate the rotors (hereinafter referred to as "propellers"). Hereinafter, such an unmanned aerial vehicle is referred to as a "multicopter".

Figure 1A:
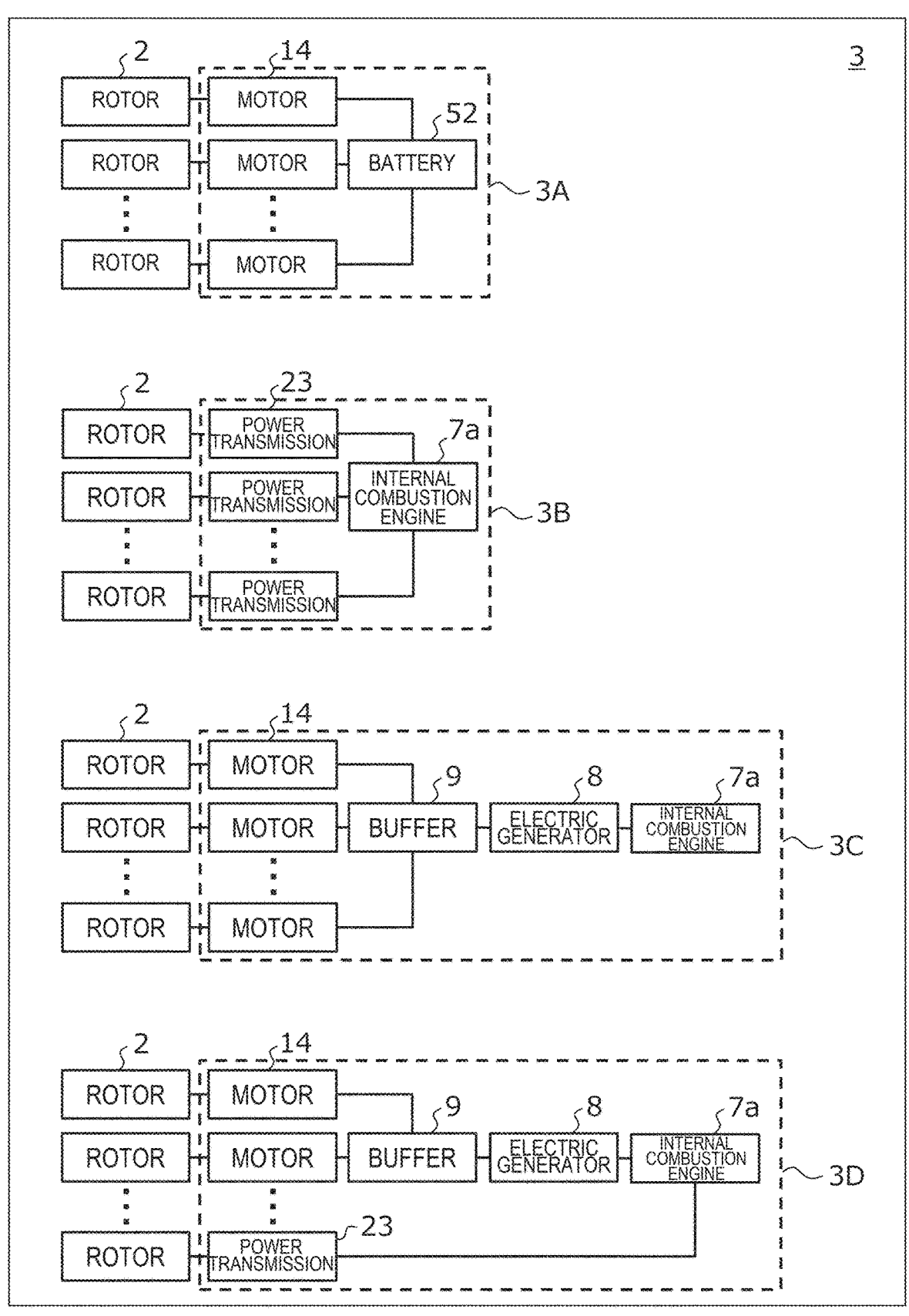
FIG. 1A is a block diagram schematically showing several examples of rotation drivers to rotate rotors in an unmanned aerial vehicle including a plurality of rotors.

The configuration of rotation drivers included in multi-copters exists in various forms. FIG. 1A is a schematic block diagram showing four examples of rotation driver 3 according to example embodiments of the present disclosure.

The first rotation driver 3A shown in FIG. 1A includes a plurality of electric motors (hereinafter referred to as "motors") 14 to rotate a plurality of rotors 2, and a battery 52 that stores electric power to be supplied to each motor 14. The battery 52 is, for example, a secondary battery such as a polymer-type lithium-ion battery. Each rotor 2 is connected to the output shaft of its corresponding motor 14 and is rotated by the motor 14. To increase payload and/or flight duration, it is necessary to increase the power storage capacity of battery 52. While the power storage capacity of the battery 52 can be increased by making the battery 52 larger, enlarging the battery 52 leads to an increase in weight.

The second rotation driver 3B shown in FIG. 1A includes a power transmission system 23 mechanically connected to rotor 2, and an internal combustion engine 7a that provides driving force (torque) to power transmission system 23. The power transmission system 23 includes mechanical components such as gears or belts and transmits torque from the output shaft of the internal combustion engine 7a to rotor 2. The internal combustion engine 7a can efficiently generate mechanical energy through fuel combustion. Examples of internal combustion engine 7a may include gasoline engines, diesel engines, and hydrogen engines. Additionally, the number of internal combustion engines 7a included in rotation driver 3B is not limited to one.

The third rotation driver 3C shown in FIG. 1A includes a plurality of motors 14, a power buffer 9 that stores electric power to be supplied to each motor 14, an electric generator 8 such as an alternator that generates electric power, and an internal combustion engine 7a that provides mechanical energy for power generation to the electric generator 8. While a typical example of the power buffer 9 is a battery such as a secondary battery, it may also be a capacitor. In the third rotation driver 3C, even when the power buffer 9 does not have a large power storage capacity, it is possible to increase payload and/or flight duration because the electric generator 8 generates electric power using the driving force (mechanical energy) of the internal combustion engine 7a. This type of driver is called "series hybrid driver". The electric generator 8 and internal combustion engine 7a in series hybrid driver are called a "range extender" as they extend the flight distance of the multicopter.

The fourth rotation driver 3D shown in FIG. 1A includes a plurality of motors 14, a power buffer 9 that stores electric power to be supplied to each motor 14, an electric generator 8 such as an alternator that generates electric power, an internal combustion engine 7a that provides driving force to the electric generator 8 for power generation, a power transmission system 23 that transmits driving force generated by the internal combustion engine 7a to the rotor 2 to rotate the rotor 2. At least one rotor 2 of the plurality of rotors 2 is rotated by the internal combustion engine 7a, while other rotors 2 are rotated by the motors 14. In the fourth rotation driver 3D, since mechanical energy generated by internal combustion engine 7a can be utilized for rotor rotation without conversion to electrical energy, energy utilization efficiency can be enhanced. This type of driver is called "parallel hybrid driver".

Figure 1B:
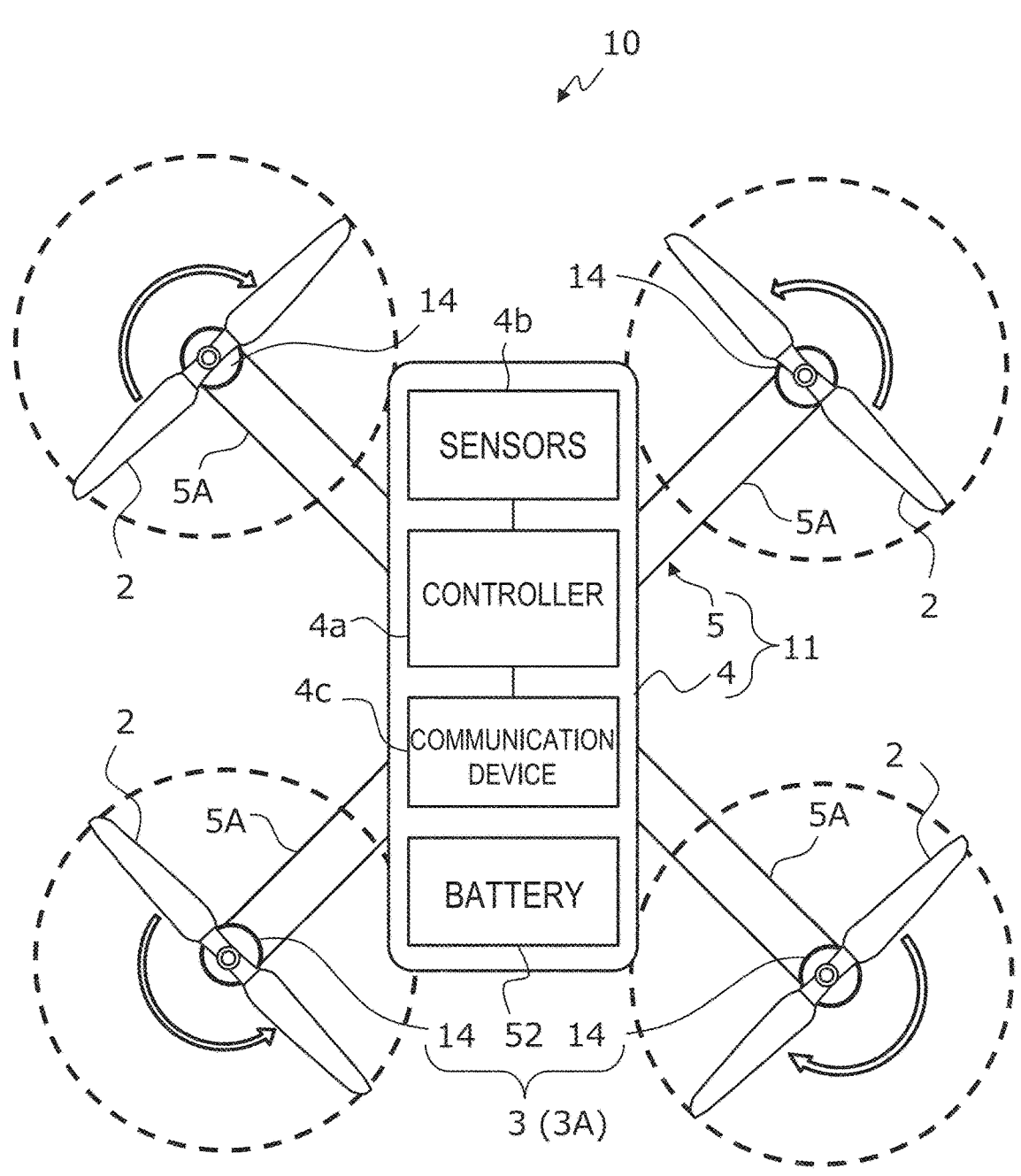
FIG. 1B is a plan view schematically showing one example of a basic configuration of an unmanned aerial vehicle including a plurality of rotors.
Figure 1C:
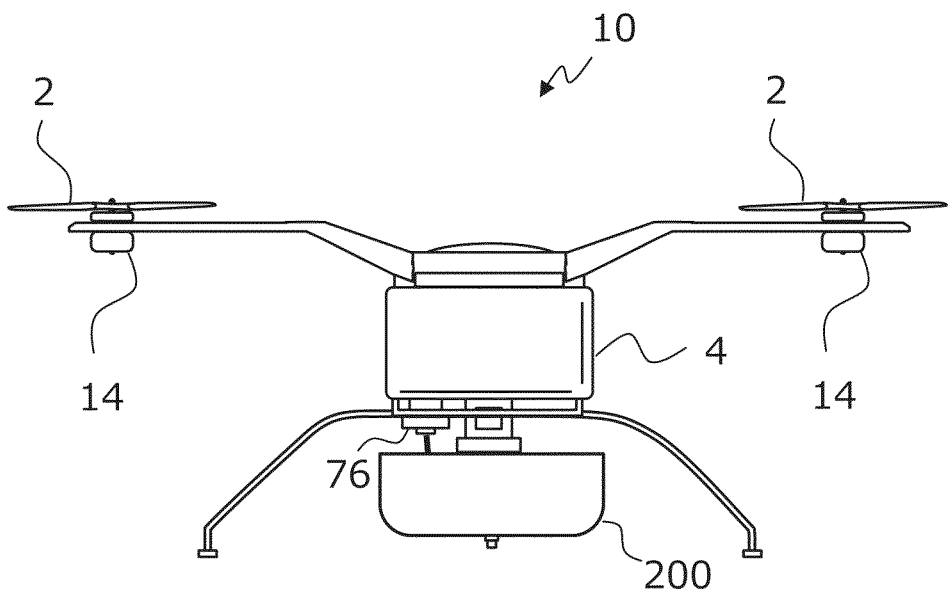
FIG. 1C is a side view schematically showing one example of a basic configuration of an unmanned aerial vehicle including a plurality of rotors.

FIG. 1B is a plan view schematically showing a basic configuration example of multicopter 10. In the configuration example of FIG. 1B, a rotation driver 3 includes the first rotation driver 3A shown in FIG. 1A. That is, in this example, rotation driver 3 (3A) includes motors 14 and a battery 52. FIG. 1C is a side view schematically showing the multicopter 10.

A multicopter 10 shown in FIGS. 1B and 1C includes a plurality of rotors 2, a main body 4, and a body frame 5 that supports rotors 2 and main body 4. The body frame 5 supports the main body 4 at its central portion and supports the plurality of rotors 2 rotatably at the plurality of arms 5A extending outward from the central portion. The motors 14 that rotate rotors 2 are provided near the ends of each arm 5A. The main body 4 and body frame 5 may be collectively referred to as "body 11".

In the example of FIG. 1B, the multicopter 10 is a quad-type multicopter (quadcopter) including four rotors 2, for example. The rotors 2 positioned on the same diagonal line rotate in the same direction (clockwise or counterclockwise), while rotors 2 positioned on different diagonal lines rotate in opposite directions.

The main body 4 includes a controller 4a configured or programmed to control the operation of devices and components mounted on multicopter 10, sensors 4b connected to the controller 4a, a communication device 4c connected to the controller 4a, and a battery 52.

The controller 4a may be configured or programmed to include, for example, a flight controller such as a flight controller and a higher-level computer (companion computer). The companion computer may perform advanced computational processing such as image processing, obstacle detection, and obstacle avoidance based on sensor data acquired by the sensors 4b.

The sensors 4b may include an acceleration sensor, an angular velocity sensor, a geomagnetic sensor, an atmospheric pressure sensor, an altitude sensor, a temperature sensor, a flow sensor, an imaging device, a laser sensor, an ultrasonic sensor, an obstacle contact sensor, and a GNSS (Global Navigation Satellite System) receiver. The acceleration sensor and angular velocity sensor may be mounted on the main body 4 as components of an IMU (Inertial Measurement Unit). Examples of laser sensors may include a laser range finder used for measuring distance to the ground, and 2D or 3D LiDAR (light detection and ranging).

The communication device 4c may include a wireless communication module for signal transmission and reception with a ground-based transmitter or ground control station (GCS) via an antenna, and a mobile communication module that utilizes cellular communication networks. The communication device 4c is configured to receive signals such as control commands transmitted from the ground and transmit sensor data such as image data acquired by sensors 4b as telemetry information. The communication device 4c may also include functions for communication between multicopters and satellite communication capabilities. The controller 4a may connect to computers in the cloud through the communication device 4c. The computer in the cloud may execute some or all of the functions of the companion computer.

A battery 52 is a secondary battery that is configured to store electric power through charging and supply electric power to motors 14 through discharging. Through the operation of the battery 52 and the plurality of motors 14, a plurality of rotors 2 can be rotationally driven to generate desired thrust. Each of the plurality of rotors 2 generally includes a plurality of blades with fixed pitch angles and generates thrust through rotation. The pitch angles may be variable. Not all of the plurality of rotors 2 need to have the same diameter (propeller diameter), and one or more rotors 2 may have a larger diameter than other rotors 2. The thrust (static thrust) generated by rotating the rotor 2 is generally proportional to the cube of the rotor's diameter. Therefore, when the rotors 2 of different diameters are included, the rotors 2 with relatively large diameters may be called "main rotors" and the rotors 2 with relatively small diameters may be called "sub-rotors". Regardless of the size of the diameter, the rotors 2 capable of generating relatively large thrust and the rotors 2 capable of generating relatively small thrust may be included depending on the configuration of rotation driver 3. In such case, the rotors 2 capable of generating relatively large thrust may be called "main rotors" and the rotors 2 capable of generating relatively small thrust may be called "sub-rotors". For example, the rotors 2 that generate relatively large thrust per rotation may be called "main rotors" and the rotors 2 that generate relatively small thrust per rotation may be called "sub-rotors". In one example, main rotors may be positioned more inward than sub-rotors. In other words, the rotors 2 may be positioned such that the distance from the center of the body to the rotation axis of each main rotor is shorter than the distance from the center to the rotation axis of each sub-rotor.

In this example, the rotation driver 3 includes a plurality of motors 14. As mentioned above, the rotation driver 3 may include the internal combustion engine 7a.

Figure 1D:
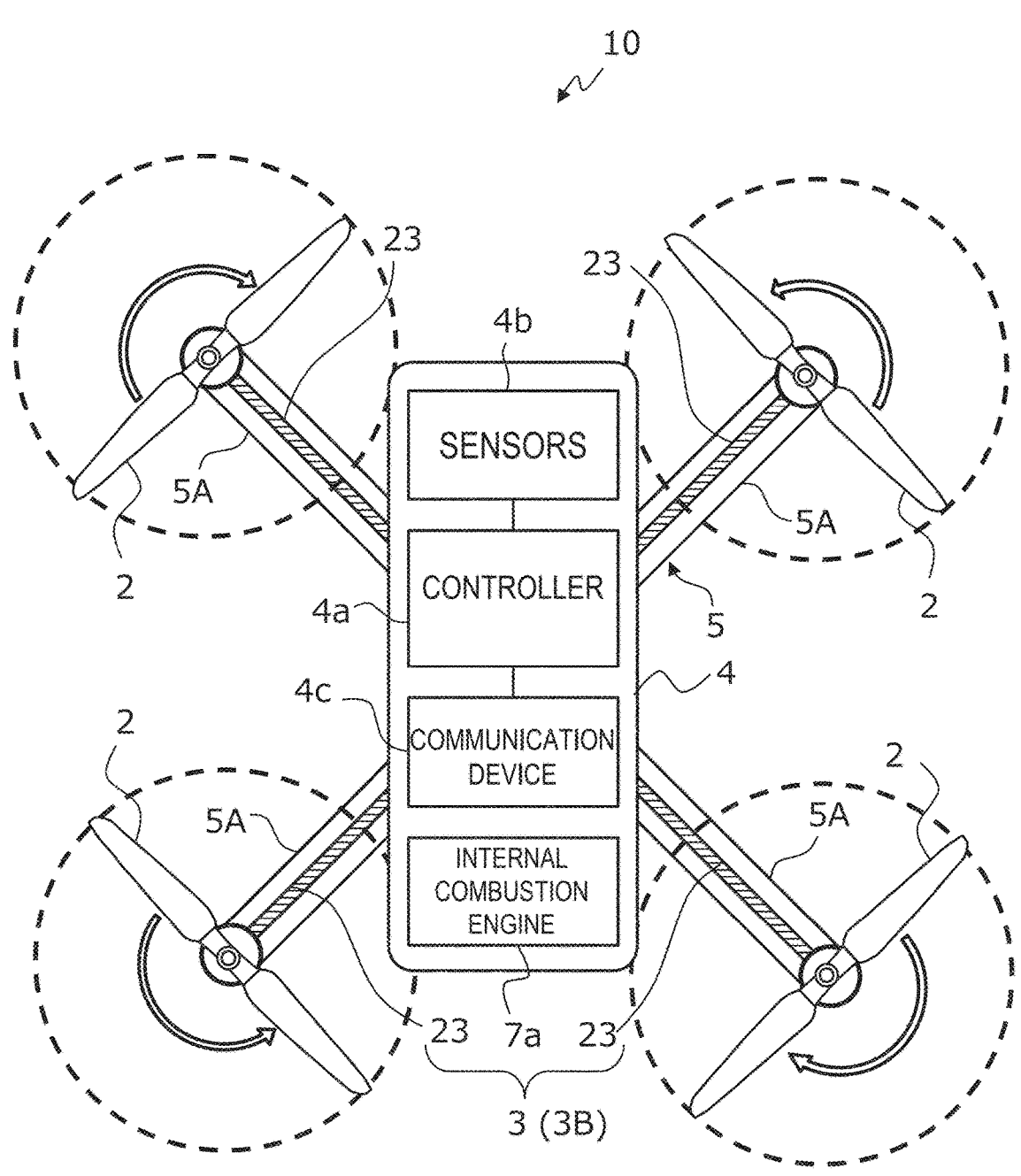
FIG. 1D is a plan view schematically showing another example of a basic configuration of an unmanned aerial vehicle including a plurality of rotors.

FIG. 1D is a plan view schematically showing a basic configuration example of a multicopter 10 including the second rotation driver 3B. In the example shown in FIG. 1D, the internal combustion engine 7a is supported by the main body 4. In this example, the driving force generated by the internal combustion engine 7a is transmitted to the plurality of rotors 2 through a plurality of power transmission systems 23 to rotate each rotor 2. The controller 4a may change the rotational speed of individual rotors 2 by controlling each power transmission system 23. Rotation driver 3B may include a mechanism for changing the pitch angle of blades of each of the plurality of rotors 2. In that case, the controller 4a may adjust the lift generated by each rotor 2 by controlling that mechanism to change the blade pitch angles.

In a "parallel hybrid driver" where some of the plurality of rotors 2 are rotated by the internal combustion engine 7a and other rotors 2 are rotated by the motors 14, the internal combustion engine 7a and battery 52 are supported by the main body 4. At least one of the plurality of rotors 2 is connected to the internal combustion engine 7a through the power transmission system 23, and other rotors 2 are connected to the motors 14.

In such a parallel hybrid driver, the diameter of one or more rotors 2 rotated by the internal combustion engine 7a may be larger than the diameter of other rotors 2 rotated by the motors 14. In other words, the internal combustion engine 7a may be used to rotate the main rotors and the motors 14 may be used to rotate the sub-rotors. In such case, the main rotors are mainly used to generate thrust, and the sub-rotors are used for both generating thrust and attitude control. The main rotors may be called "booster rotors" and the sub-rotors may be called "attitude control rotors".

In the parallel hybrid driver, the internal combustion engine is used for both thrust generation and power generation. By selectively transmitting driving force (torque) generated by the internal combustion engine to either or both of the rotor and electric generator, it is possible to achieve balanced thrust generation and power generation.

When a multicopter includes an internal combustion engine and uses the internal combustion engine for at least one of thrust generation and power generation, this contributes to increased payload and flight duration. It is desirable to perform attitude control of the multicopter by rotating propellers using motors, which have superior response characteristics compared to internal combustion engines. Therefore, in applications where accurate attitude control of the multicopter is required, it is desirable to adopt a parallel hybrid driver or a series hybrid driver to increase payload and flight duration. Note that when the rotation driver 3 includes a mechanism for changing the pitch angle of blades of each of the plurality of the rotors 2, the attitude can also be adjusted by changing the pitch angle of each blade.

Through increased payload and flight duration, the applications of multicopters can be further expanded. For example, in the agricultural field, multicopters are currently being used for agricultural chemical spraying or crop growth monitoring. Various agricultural work can be performed from the air by connecting various ground work machines (hereinafter may be simply referred to as "work machines") to the multicopter. Agricultural work machines are sometimes referred to as "implements". Examples of work machines may include sprayers for spraying chemicals on crops, mowers, seeders, spreaders (fertilizer applicators), rakes, balers, harvesters, plows, harrows, or rotary tillers. Work vehicles such as tractors are not included in "work implements" in this disclosure.

In the example shown in FIG. 1C, an implement 200 capable of dispersing substances such as agricultural chemicals or fertilizers onto a field or crops in the field is connected to multicopter 10. Increased payload and flight duration enable the implement 200 to achieve a larger size and/or multi-functionality. For example, by changing the implement 200 connected to the multicopter 10, various ground operations (agricultural work) including liquid application, granular application, fertilization, thinning, weeding, transplanting, direct seeding, and harvesting can be performed. The implement 200 may include mechanisms such as robotic hands. In that case, a single implement 200 can perform various ground operations. When the implement 200 includes space large enough to store materials, the implement 200 can also transport agricultural materials or harvested crops over a wide area. There are various forms of connecting the implement 200 to the multicopter 10. The multicopter 10 may suspend and tow the implement 200 using a cable. The implement 200 towed by the multicopter 10 can perform ground operations while being towed during flight or hovering of multicopter 10. The implement 200 during operation may be in the air or on the ground.

In the example shown in FIG. 1C, the multicopter 10 includes the power supply 76. The power supply 76 is a device that supplies power to the implement 200 from driving energy sources such as a battery 52 or an electric generator 8 included in the multicopter 10. Various functions of the implement 200 may be performed using this power. The implement 200 includes actuators such as motors that operate using power obtained from the power supply 76 of the multicopter 10. The implement 200 preferably includes a battery for storing power.

Figure 2A:
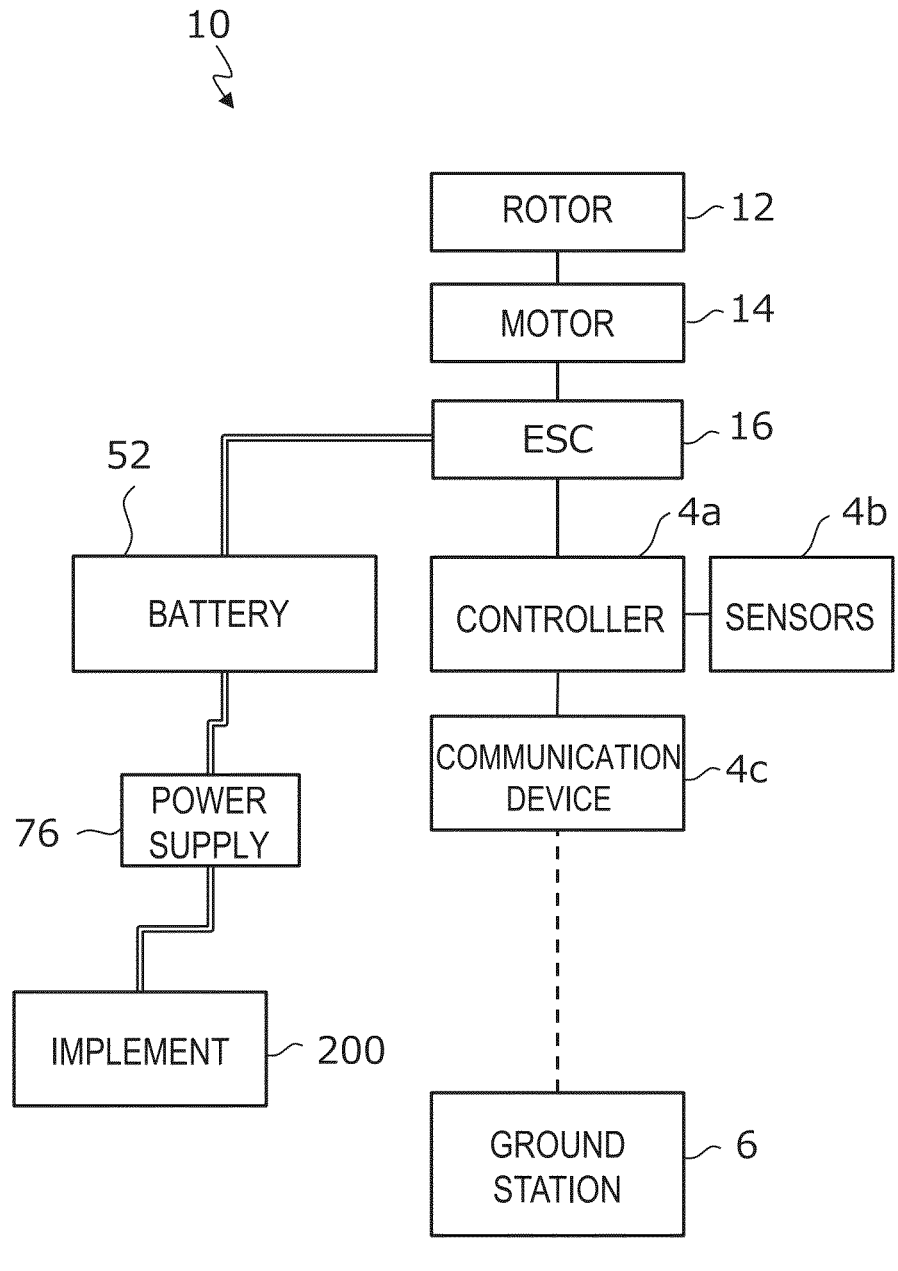
FIG. 2A is a block diagram showing a basic configuration example of a battery-driven multicopter.

FIG. 2A shows a block diagram of a basic configuration example of a battery-driven multicopter 10. The battery-driven multicopter 10 includes a plurality of rotors 12, a plurality of motors 14, each driving respective one of the plurality of rotors 12, a plurality of ESCs (Electric Speed Controllers) 16 each including a motor drive circuit that drives respective one of the plurality of motors 14, a battery 52 that supplies power to each of the plurality of motors 14 through each respective ESC 16, a controller 4a configured or programmed to control a plurality of ESCs 16 to control attitude while flying, sensors 4b, a communication device 4c, and a power supply 76 that is electrically connected to the battery 52. In FIG. 2A, for simplicity, the rotor 12, the motor 14, and the ESC 16 are each shown by a single block, but the numbers of rotors 12, motors 14, and ESCs 16 are each plural. This also applies to FIGS. 2B and 2C. The ESC 16 may be included in the controller 4a.

The controller 4a may receive control commands wirelessly from, for example, a ground station 6 on the ground through the communication device 4c. The number of ground stations 6 is not limited to one, and the ground station 6 may be distributed across a plurality of locations. The communication device 4c may also wirelessly receive control commands from an operator's controller on the ground. The controller 4a may have functions to automatically or autonomously execute takeoff, flight, obstacle avoidance, and landing operations based on sensor data obtained from the sensors 4b. The controller 4a may be configured or programmed to communicate with the implement 200 connected to the power supply 76 and obtain signals indicating the state of the implement 200. Additionally, the controller 4a may provide signals to control the operation of the implement 200. Furthermore, the implement 200 may generate signals to instruct the operation of multicopter 10 and transmit them to the controller 4a. Such communication between the controller 4a and the implement 200 may be conducted through wired or wireless means.

Figure 2B:
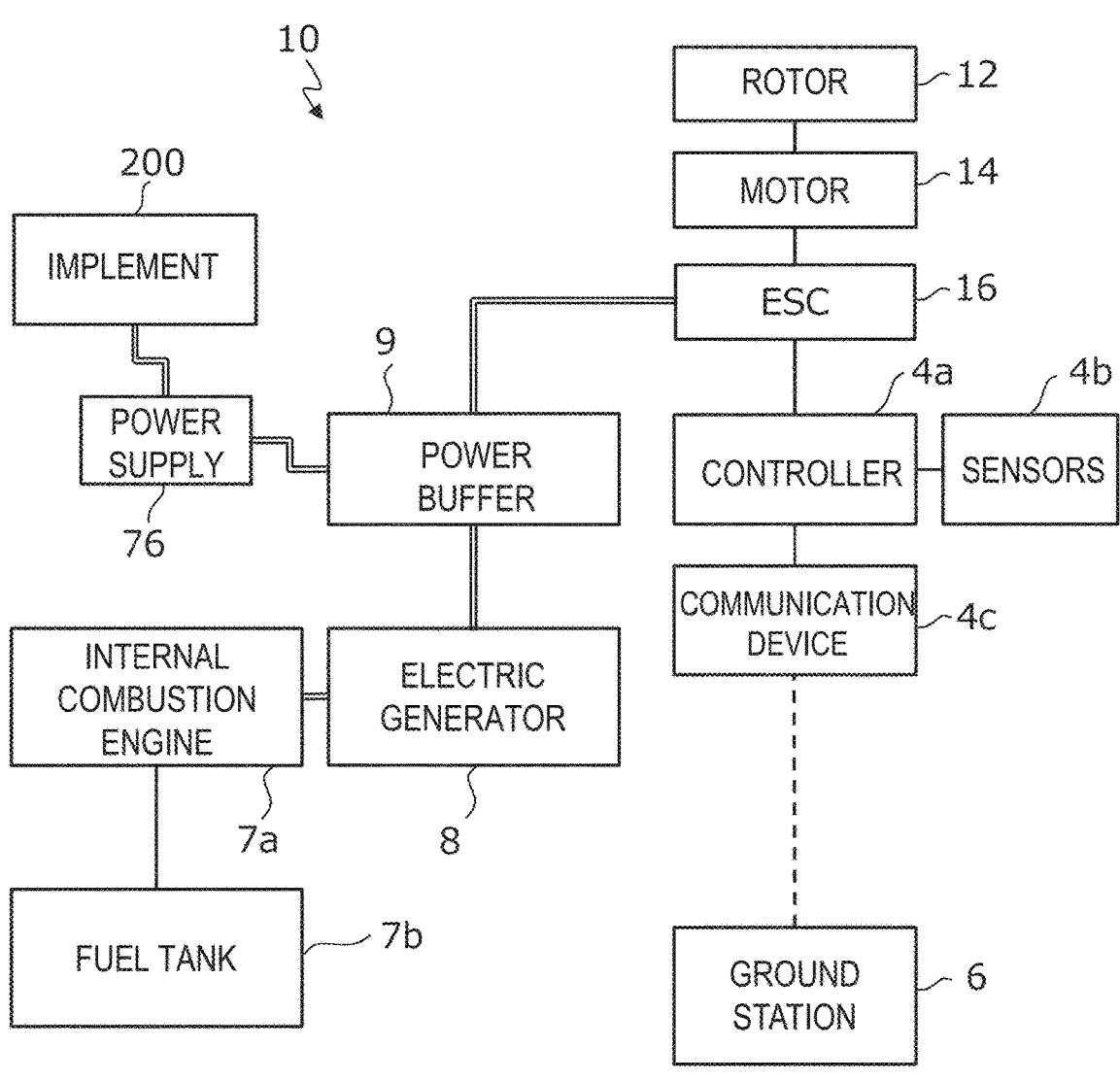
FIG. 2B is a block diagram showing a basic configuration example of a series hybrid type multicopter.

FIG. 2B is a block diagram showing a basic configuration example of a series hybrid drive type multicopter 10. Like the battery-driven multicopter 10, the series hybrid drive type multicopter 10 includes a plurality of rotors 12, a plurality of motors 14, a plurality of ESCs 16, a controller 4a, sensors 4b, and a communication device 4c. The series hybrid drive type multicopter 10 shown in the figure further includes an internal combustion engine 7a, a fuel tank 7b that stores fuel for the internal combustion engine 7a, an electric generator 8 that is driven by the internal combustion engine 7a to generate electric power, a power buffer 9 that temporarily stores electric power generated by the electric generator 8, and a power supply 76 that is electrically connected to the power buffer 9. The power buffer 9 is, for example, a battery such as a secondary battery. Electric power generated by the electric generator 8 is supplied to the motors 14 through the power buffer 9 and the ESCs 16. Additionally, the electric power generated by the electric generator 8 may be supplied to the implement 200 through the power supply 76.

Figure 2C:
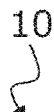
FIG. 2C is a block diagram showing a basic configuration example of a parallel hybrid type multicopter.

FIG. 2C is a block diagram showing a basic configuration example of a parallel hybrid drive type multicopter 10. Like the series hybrid drive type multicopter 10, the parallel hybrid drive type multicopter 10 includes a plurality of rotors 12, a plurality of motors 14, each driving respective one of the plurality of rotors 12, a plurality of ESCs 16, a controller 4a, sensors 4b, a communication device 4c, an internal combustion engine 7a, a fuel tank 7b, an electric generator 8, a power buffer 9, and a power supply 76. The parallel hybrid drive type multicopter 10 further includes a drivetrain 27 that transmits driving force from the internal combustion engine 7a, and the rotor 22 that rotates upon the receiving driving force from the internal combustion engine 7a through the drivetrain 27. The rotor 12 and rotor 22 may be distinguished by calling one "first rotor" and the other "second rotor". The number of rotors 22 connected to drivetrain 27 and rotated may be one or two or more.

In the parallel hybrid drive type multicopter 10, the internal combustion engine 7a not only drives the electric generator 8 to generate power, but also mechanically transmits energy to the rotor 22 to rotate the rotor 22. In contrast, in the series hybrid drive type multicopter 10, all rotors 12 are rotated by electric power generated by the electric generator 8. Therefore, in the series hybrid drive type multicopter 10, when the electric generator 8 is, for example, a fuel cell, the internal combustion engine 7a is not an essential component.

The following describes configuration examples and operation examples of an unmanned aircraft according to example embodiments of the present disclosure, taking a parallel hybrid drive multicopter as an example.

Figure 3A:
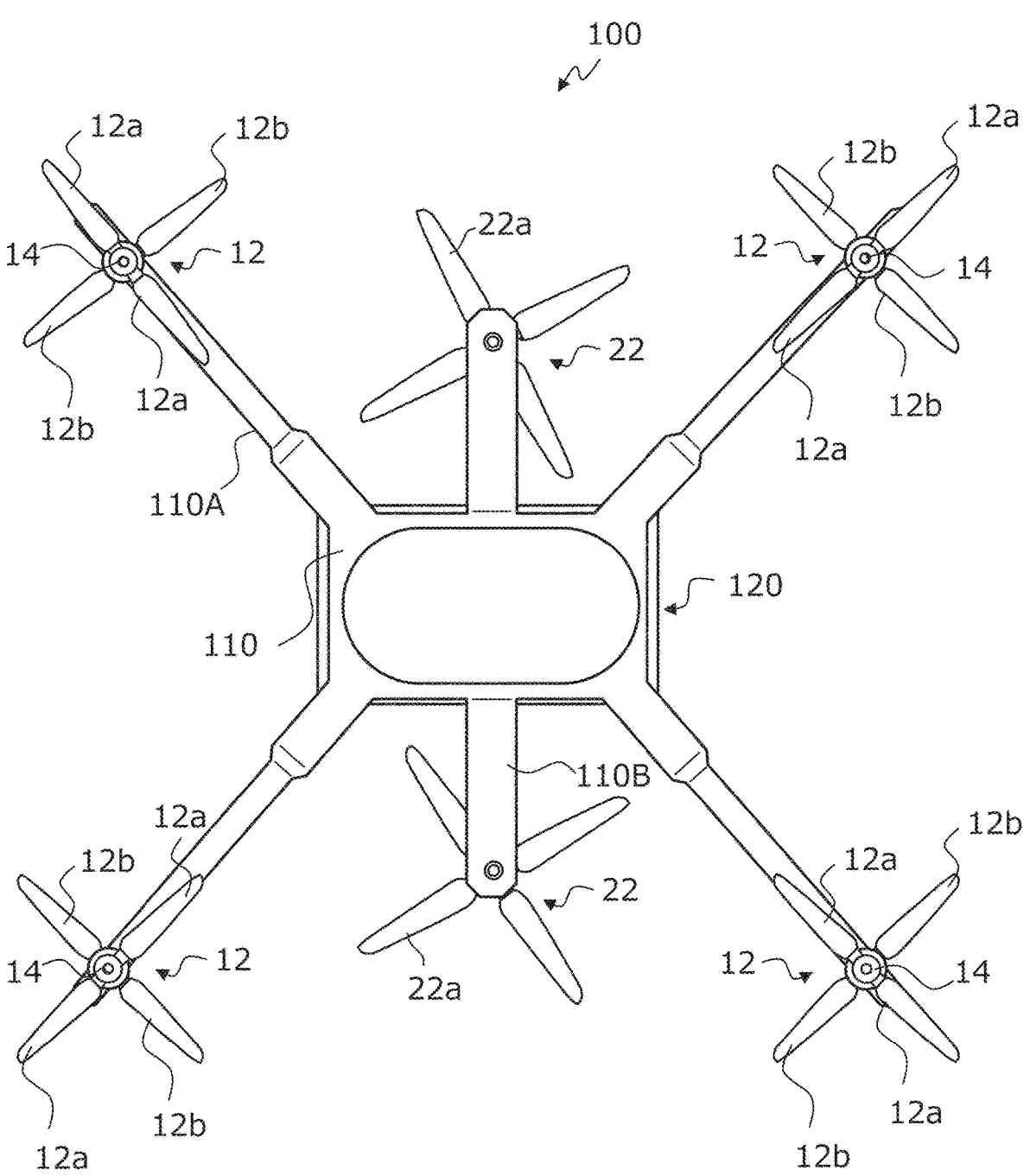
FIG. 3A is a top view schematically showing a multicopter according to an example embodiment of the present invention.
Figure 3B:
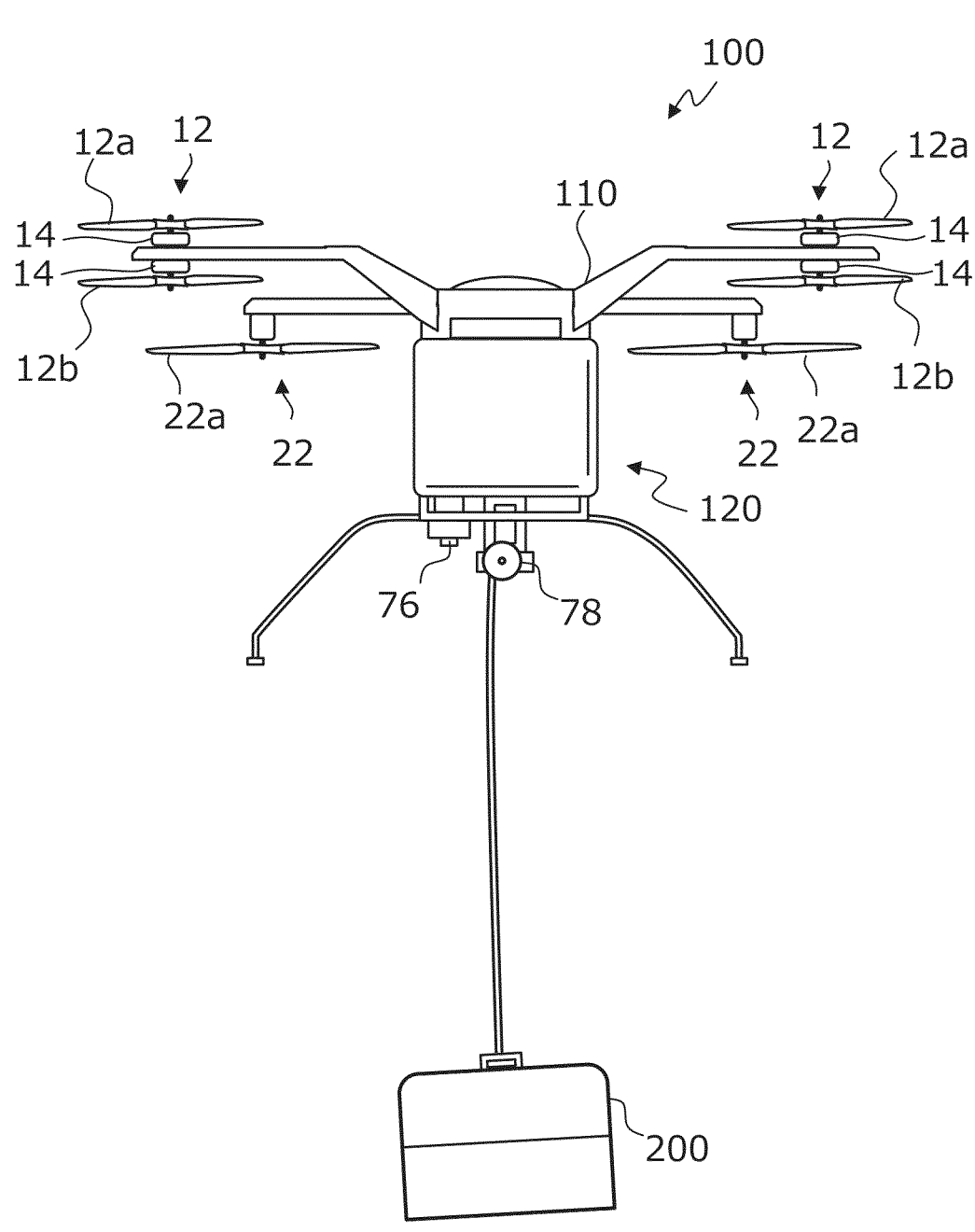
FIG. 3B is a side view schematically showing the multicopter according to the present example embodiment of the present invention.

FIG. 3A is a top view schematically showing a multicopter 100 according to the present example embodiment, and FIG. 3B is a side view thereof. In FIG. 3B, an implement 200 connected to the multicopter 100 is shown. The multicopter 100 may be connected with cargo, agricultural materials, other machinery, or containers, cases, or packages capable of accommodating them, together with or in place of the implement 200. Hereinafter, the weight of the implement 200 and the implement itself may be referred to as "payload". The "connection" between the multicopter 100 and the implement 200 or the like may be made by various instruments or devices.

The multicopter 100 shown in FIG. 3A includes eight sub-rotors 12 and two main rotors 22, for example. The sub-rotors 12 include four sets of propellers 12a and 12b that rotate in opposite directions on the same axis, for example. Each of propellers 12a and 12b includes two blades, for example. The propellers 12a, 12b are each rotated by motors 14. The four sets of propellers 12a and 12b rotating in opposite directions on the same axis are located at vertices of a quadrilateral. The main rotors 22 include two propellers 22a rotating in opposite directions at different positions. Each propeller 22a includes four blades. The eight propellers 12a, 12b of sub-rotor 12 have the same pitch angle and diameter. The two propellers 22a of main rotor 22 also have the same pitch angle and diameter. The diameter of propeller 22a is about 1.2 times or more, for example, about 1.4 times or more and about 2.0 times or less, than the diameter of propellers 12a, 12b.

The multicopter 100 includes a body frame 110 including four arms 110A for the sub-rotors 12 and two arms 110B for the main rotors 22, for example. The body frame 110 supports a main body 120 including various electronic components and mechanical components described later.

In the example of FIG. 3B, the main body 120 includes a power supply 76 and an actuator 78 used to connect to the implement 200 and other purposes. The power supply 76 is a device that supplies power generated within the main body 120 to the implement 200. The actuator 78 is a device such as an electric motor that performs operations to connect the implement 200 to the main body 120 of the multicopter 100. In the example of FIG. 3B, the actuator 78 drives a mechanism to wind up a cable connecting the main body 120 and the implement 200. This cable may include a power line for supplying power to the implement 200 from the multicopter 100, and a communication line for communication between the multicopter 100 and the implement 200.

Figure 4:
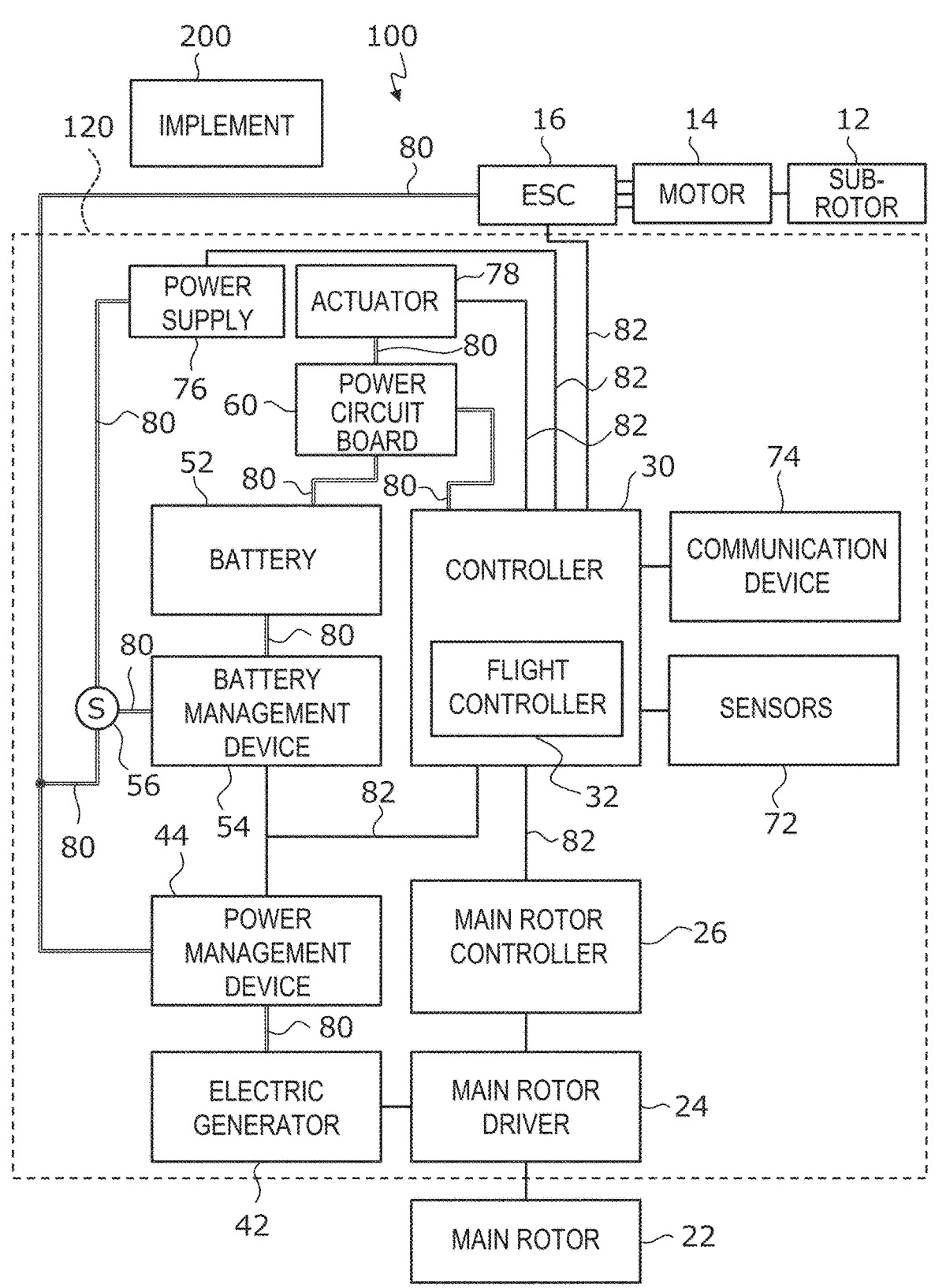
FIG. 4 is a block diagram showing an example of system configuration in the multicopter of the present example embodiment of the present invention.

FIG. 4 is a block diagram showing an example of the system configuration of the multicopter 100 according to the present example embodiment.

In the illustrated example, the main body 120 of the multicopter 100 includes a controller 30 including a flight controller 32, sensors 72, and a communication device 74. These are basically similar to the controller 4a, sensors 4b, and communication device 4c included in the main body 4 of the multicopter 10 explained with reference to FIG. 1A.

The multicopter 100 according to the present example embodiment includes eight sub-rotors 12, eight motors 14 that respectively rotate the eight sub-rotors 12, and eight ESCs that respectively control the eight motors 14, for example. Each ESC 16 receives a motor control signal to control the motor 14 from the controller 30 via a wiring 82. The motor control signal is, for example, a PWM (Pulse Width Modulation) signal. When the motor control signal is a PWM signal, the duty cycle of the PWM signal may indicate an analog value of the motor rotation speed. Each ESC 16 controls the rotation speed of the motor 14 connected to that ESC 16 based on the motor control signal from the controller 30. In FIG. 4, for simplicity, one set of "sub-rotor 12, motor 14 and ESC 16" is shown, but the multicopter 100 according to the present example embodiment includes eight sets of "sub-rotor 12, motor 14 and ESC 16", for example. The number of these sets is not limited to eight.

The controller 30 is connected to individual ESCs 16 via electrically independent wiring 82 and may individually control each of the eight ESCs 16. As mentioned earlier, the sub-rotor 12 is used not only to generate lift but also for attitude control. Attitude control is achieved by the flight controller 32 of the controller 30 obtaining measured or estimated values indicating the attitude of the main body 120 from the sensors 72 to determine the current attitude of the main body 120, and controlling the rotation speed of individual motors 14 according to the difference from the target attitude.

The main body 120 includes a main rotor driver 24 that drives the main rotor 22 and a main rotor controller 26 that controls the main rotor drive component 24. In this example embodiment, the main rotor drive component 24 is an internal combustion engine. Therefore, the main rotor controller 26 includes an Engine Controller (ECU). The main rotor controller 26 is configured or programmed to execute control of the internal combustion engine by acquiring sensor data such as throttle opening, intake temperature, engine speed, and temperature of various portions of the main rotor drive component 24, which is an internal combustion engine. The main rotor controller 26 is connected to the controller 30 via wiring 82 such as a CAN (Controller Area Network) bus. The main rotor controller 26 is configured or programmed to output engine control signals based on signals transmitted from the controller 30. The engine control signal includes, for example, throttle opening. A digital-to-analog converter (DAC) and/or voltage converter may be connected between the controller 30 and the main rotor controller 26. Mechanical devices such as a reduction gear may be provided between the main rotor driver 24 and the main rotor 22.

The main rotor driver 24 preferably is an internal combustion engine with minimal vibration. In this example embodiment, the main rotor driver 24 is, for example, an opposed piston engine. The opposed piston engine is disclosed in, for example, Japanese Patent No. 5508604. The entire contents of Japanese Patent No. 5508604 are hereby incorporated by reference.

The main rotor driver 24, which is an internal combustion engine, may drive an electric generator 42 such as an alternator to generate power. In this example embodiment, the electric generator 42 has the structure of an AC synchronous motor including a rotor and a stator. Therefore, the electric generator 42 may also function as a "starter" by rotating the rotor through energization during startup of the main rotor driver 24. The electric generator 42 rectifies the alternating current generated by power generation to convert it to direct current. The electric generator 42 generates direct current power required for driving the motor 14 and supplies it to each ESC 16 via wiring 80. The electric generator 42 is configured to output, for example, a direct current voltage of 250V or higher. Note that the wiring 80 is power wiring, and the wiring 82 is signal wiring. Each of wirings 80 and 82 includes a plurality of conductors.

The electric generator 42 is connected to a power management device 44. The power management device 44 is connected to the controller 30 and a battery management device 54 to be described later. The power management device 44 may control the amount of power generation by the electric generator 42 based on signals from the controller 30 or the battery management device 54. This amount of power generation may be variably controlled by the power management device 44 according to the power required by the motor 14 and battery 52, even when the engine speed of the main rotor driver 24, which is an internal combustion engine, is in a constant state.

The main body 120 further includes a battery 52 including a plurality of cells of, for example, lithium-ion secondary batteries connected in series or parallel, and a battery management device 54 that controls charging and discharging of the battery 52.

The battery 52 may receive direct current power from the electric generator 42 via a power switch 56 and be charged by that power. The operation of the power switch 56 may be controlled by the battery management device 54 and the controller 30. The battery management device 54 is a device that measures or estimates parameter values defining the state of the battery 52, such as current flowing through the battery 52, cell voltage, cell balance, State Of Charge (SOC), State Of Health (SOH), and temperature.

The battery management device 54 may control the power switch 56 according to the state of the battery 52. For example, when the battery 52 is in a state requiring charging, the battery management device 54 electrically connects the electric generator 42 and battery 52 by means of the power switch 56, and supplies power from the electric generator 42 to the battery 52 to execute charging operation. At this time, the battery management device 54 may control the power management device 44 and increase the amount of power generation by the electric generator 42 so that the power supplied to the ESC 16 does not fall below a desired level. In contrast, when the battery 52 is in a state not requiring charging, the battery management device 54 disconnects the electrical connection between the electric generator 42 and battery 52 by the power switch 56, thereby stopping the charging of the battery 52.

In this example embodiment, the battery 52 has a power storage capacity that allows, even when power generation by the electric generator 42 stops for some reason and lift from the main rotor 22 is lost, continued generation of lift and attitude control by the sub-rotor 12 to fly to a location where landing is possible and land there. In other words, when the multicopter 100 according to this example embodiment is flying normally, the power required to drive the sub-rotor 12 can be supplied to the ESC 16 from the electric generator 42 rather than from the battery 52. Therefore, even when increasing payload and flight duration, there is little need to increase the power storage capacity of battery 52 accordingly.

The power stored in battery 52 may be output as, for example, a direct current voltage of 250V or higher. However, this direct current voltage decreases with decreasing state of charge. Therefore, when the state of charge falls below a predetermined level, the battery management device 54 operates to supply a portion of the direct current power from the electric generator 42 to the battery 52 to charge the battery 52.

The battery 52 is connected to a power circuit board 60. The power circuit board 60 has the function of stepping down the voltage output from the battery 52 to, for example, 24V, 12V, and 5V. The direct current voltage output from the battery 52 is converted to a desired voltage by the power circuit board 60 before being supplied to other electronic components.

In the example of FIG. 4, the power supply 76 is electrically connected to the electric generator 42 or battery 52 via the power switch 56. The power supply 76 in this example is configured to supply power generated within the main body 120 to external machines and devices such as the implement 200.

The main body 120 may have configurations not shown in FIG. 4. For example, the main body 120 may include a fuel tank for storing fuel required for operation of the main rotor driver 24, water-cooled or air-cooled devices for cooling the main rotor driver 24, and electrical equipment such as lighting devices and electric pumps. The electrical equipment may operate on power stepped down to a predetermined voltage by the power circuit board 60. Additionally, a battery (auxiliary battery) for electrical equipment may be provided and configured to supply power to the electrical equipment. Such an auxiliary battery may be charged from the battery 52 or the electric generator 42.

In this example embodiment, the motor 14 functions as a plurality of "attitude controllers" that respectively drive a plurality of first rotors (sub-rotors) 12. Additionally, the main rotor driver 24, which is an internal combustion engine, functions as a "main thrust generating device" that drives the second rotor (main rotor) 22.

In this example embodiment, the controller 30 may vary the ratio (power ratio) between the first drive power output from a plurality of motors 14 and the second drive power output from the main rotor driver 24.

Generally, the responsiveness of the motor 14 is superior to that of internal combustion engines. Regarding the torque required for rotation of rotors 12, 22, when the time from the input of a torque command signal to the achievement of the torque target value is called the "response time," the response time of motors is, for example, about 1/100 of that of internal combustion engines. Therefore, to control the attitude of the multicopter 100, it is desirable to detect the difference between the current value and target value of the attitude angle of the multicopter 100, and control the rotation speed of each of the plurality of sub-rotors 12 with high response speed to reduce this difference. An increase in rotor rotation speed generates an increase in thrust. By adjusting the thrust of each of the plurality of sub-rotors 12, it is possible to control the attitude of the multicopter 100 with high precision and quickly.

In contrast, internal combustion engines efficiently generate large thrust. While the rotation of the sub-rotor 12 is performed using power generated by the power of the main rotor driver 24, which is an internal combustion engine, energy loss occurs when converting mechanical energy to electrical energy. Therefore, from the viewpoint of improving energy consumption efficiency, it is preferable that the main rotor driver 24 be used for main thrust generation by rotating the main rotor 22. Additionally, to increase the thrust of the main rotor 22, it is preferable that the diameter of the main rotor 22 be larger than the diameter of each of the plurality of first rotors 12.

The multicopter according to this example embodiment includes a power generator, a main battery capable of being charged with power generated by the power generator, a first electrical component, a second electrical component, a sub-battery, and a charging circuit connecting the second electrical component and the sub-battery. The sub-battery may be mounted on the power circuit board. The sub-battery is configured to be charged by receiving power from the second electrical component through the charging circuit, and configured to supply power to the first electrical component.

The first electrical component monitors the power of the battery. In this example embodiment, the first electrical component is, for example, the battery management device 54 mentioned earlier. Hereinafter, to distinguish from the sub-battery, the battery 52 mentioned earlier is referred to as main battery 52.

Figure 5:
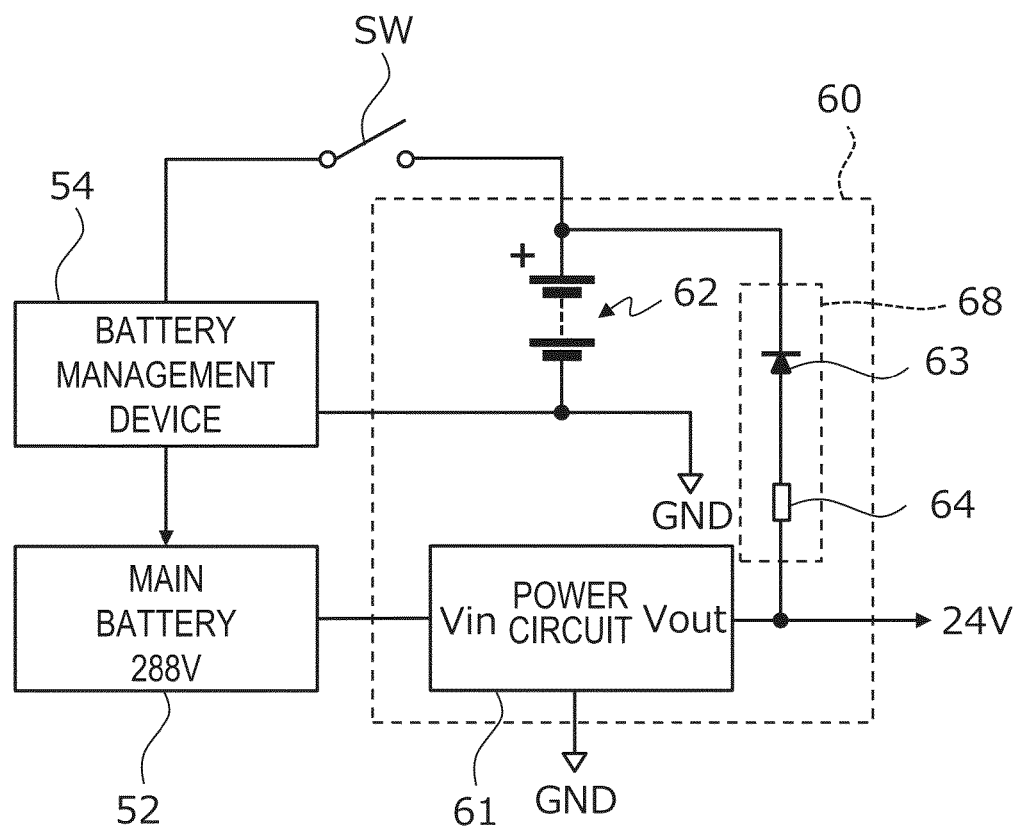
FIG. 5 is a block diagram showing a configuration example of a power circuit board.

FIG. 5 is a block diagram showing a configuration example of the power circuit board 60.

In this example embodiment, the second electrical component is, for example, a power circuit. In the example of the power circuit board 60 shown in FIG. 5, the power circuit board 60 includes a power circuit 61, a sub-battery 62, and a charging circuit 68 provided between the output terminal Vout of the power circuit 61 and the sub-battery 62. The charging circuit 68 includes a diode 63 and a resistor 64 connected in series.

An example of the power circuit 61 is a DC-DC converter. The power circuit 61 generates a direct current voltage, which is a stepped-down voltage, by stepping down the battery voltage of the main battery 52. As mentioned earlier, the power circuit board 60 has the function of stepping down the voltage output from the main battery 52 to, for example, 24V, 12V, and 5V. The battery voltage of the main battery 52 in this example embodiment is 288V. In other words, the direct current voltage output from the battery 52 is 288V. However, this voltage value is merely an example, and the direct current voltage may be, for example, 250V or higher. In this example embodiment, the power circuit 61 is a DC-DC converter that steps down a battery voltage of 288V to a direct current voltage of 24V. The direct current voltage is not limited to 24V. Thus, in the example shown in FIG. 5, a direct current voltage of 24V is output from the output terminal Vout of the power circuit 61.

The power circuit board 60 may further include a DC-DC converter for stepping down the direct current voltage of 24V output from the power circuit 61 to, for example, a direct current voltage of 12V. The direct current voltage of 12V may be supplied to a plurality of electrical components including, for example, the main rotor controller 26 (ECU), decompression controller, water pump, and fuel pump. The decompression controller is a device to control the operation of a decompression mechanism provided in the main rotor driver 24, which is an internal combustion engine. An example of the decompression controller is a solenoid. A solenoid is a type of motor. The main body 120 includes a water-cooling system for cooling the main rotor driver 24. The water-cooling system includes, for example, a water pump, radiator, radiator fan, and thermostat. The water pump is an electrical component to control the circulation of coolant (cooling water) supplied to the main rotor driver 24. The fuel pump is an electrical component for supplying fuel from the fuel tank to the main rotor driver 24.

The sub-battery 62 is electrically connected between the output terminal Vout of the power circuit 61 and GND. Power is supplied from the output terminal Vout of the power circuit 61 to the sub-battery 62. In this example embodiment, the sub-battery 62 includes, for example, six 4.3V batteries connected in series, for example. That is, the battery voltage of the sub-battery 62 is 25.8V, for example, which is higher than the direct current voltage of 24V output from the output terminal Vout of the power circuit 61. In other words, the battery voltage of the sub-battery 62 in a fully charged state is higher than the voltage output from the output terminal Vout of the power circuit 61.

The sub-battery 62 is connected to the output terminal Vout of the power circuit 61 through the diode 63 and resistor 64 connected in series. More specifically, the positive terminal of the sub-battery 62 is connected to the output terminal Vout of the power circuit 61 through the diode 63 and resistor 64, and the negative terminal of the sub-battery 62 is connected to ground. The resistance value of the resistor 64 is, for example, about a dozen ohms.

When the sub-battery 62 is in a fully charged state, the potential (e.g., 25.8V) of the positive terminal of the sub-battery 62 is higher than the direct current voltage of 24V, for example, output from the output terminal Vout of the power circuit 61. Therefore, due to the rectifying effect of the diode 63, current does not flow from the power circuit 61 to the resistor 64. In contrast, when the state of charge of the sub-battery 62 decreases and the potential of the positive terminal of the sub-battery 62 falls below 24V, a potential difference occurs between the positive terminal of the sub-battery 62 and the output terminal Vout. When this potential difference exceeds the threshold voltage of the diode 63, current flows from the power circuit 61 to the sub-battery 62 through the resistor 64. In other words, power is supplied from the main battery 52 to the sub-battery 62. In this way, when the state of charge of the sub-battery 62 decreases, it is possible to charge the sub-battery 62 using a relatively simple circuit.

The multicopter according to this example embodiment includes a switching circuit to switch on or off the supply of power from the sub-battery 62 to the battery management device 54. The switching circuit includes a switch SW that electrically connects the battery management device 54 and the sub-battery 62 when starting up the battery management device 54, as exemplified in FIG. 5. In other words, the switching circuit electrically connects the battery management device 54 and the sub-battery 62 in response to the start of the internal combustion engine (or main rotor driver). This allows power to be supplied from the sub-battery 62 to the battery management device 54.

As illustrated in FIG. 5, the switch SW of the switching circuit is electrically connected between the battery management device 54 and the sub-battery 62. An example of the switch SW is an ignition switch. When the switch SW is turned on, power supply from the sub-battery 62 to the battery management device 54 begins. The battery management device 54 is configured to determine whether to supply power from the main battery 52 to the battery management device 54 and the power circuit 61 according to the state of the main battery 52, in response to the start of the startup power supply from the sub-battery 62.

In this example embodiment, as mentioned earlier, the battery management device 54 measures or estimates parameter values defining the state of the main battery 52, such as current flowing through the main battery 52, cell voltage, cell balance, SOC, SOH, temperature, and power amount, and determines whether to supply power from the main battery 52 to the battery management device 54 and the power circuit 61 based on the measured or estimated parameter values. Thresholds for deciding whether to supply power may be set for each parameter value. For example, the battery management device 54 may prohibit power supply from the main battery 52 to the battery management device 54 and the power circuit 61 if any one of these parameter values is below the threshold. The battery management device 54 may allow power supply from the main battery 52 to the battery management device 54 and the power circuit 61 if all of these parameter values are equal to or above the thresholds.

Figure 6:
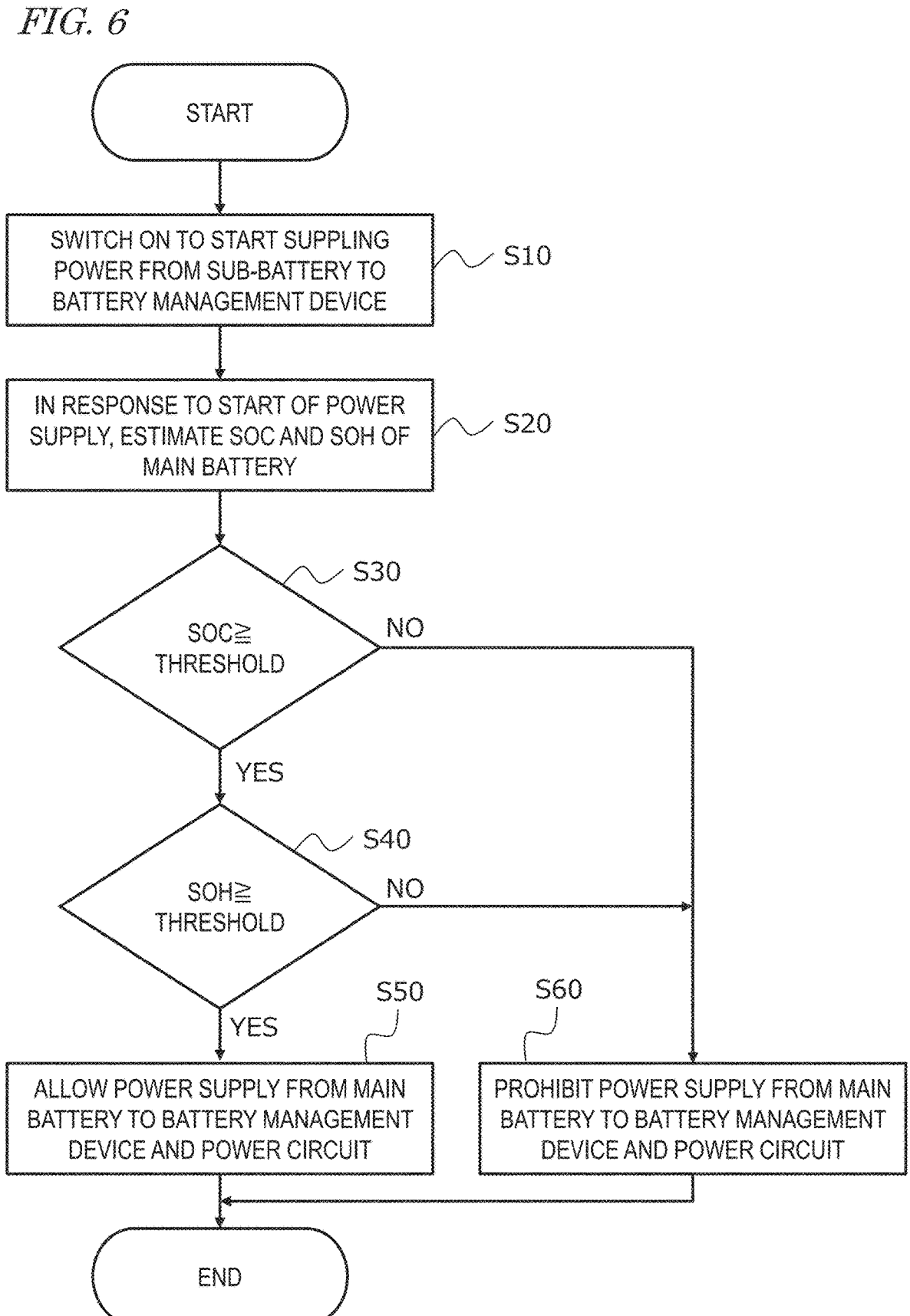
FIG. 6 is a flowchart showing an example procedure for determining whether to supply power from the main battery to the battery management device and power circuit based on the SOC and SOH of the main battery.

Referring to FIG. 6, an example procedure for determining whether to supply power from the main battery 52 to the battery management device 54 and the power circuit 61 according to the SOC and SOH of the main battery 52 will be explained.

FIG. 6 is a flowchart showing an example procedure for determining whether to supply power from the main battery 52 to the battery management device 54 and the power circuit 61 according to the SOC and SOH of the main battery 52. In the procedure exemplified in FIG. 6, the battery management device 54 determines whether to supply power from the main battery 52 to the battery management device 54 and the power circuit 61 based on the measured or estimated SOC and SOH of the main battery 52.

In this example embodiment, the sub-battery 62 is already in a fully charged state before the switch SW is turned on. As mentioned earlier, while the power circuit 61 is operating, power is supplied from the main battery 52 to the sub-battery 62 according to the potential difference between the positive terminal of the sub-battery 62 and the output terminal Vout of the power circuit 61.

Here, before starting the main rotor driver 24, i.e., before taking off the multicopter, the switch (ignition switch) SW is off. While the switch (ignition switch) SW is off, power is not supplied from the main battery 52 to the electrical components. In other words, power is not supplied from the power circuit 61 to the electrical components. When taking off the multicopter, first, a startup command is sent to the multicopter from an external controller (controller), or a management device, etc. In response, the switch (ignition switch) SW turns on, and the supply of startup power from the sub-battery 62 to the battery management device 54 begins (step S10).

Next, in response to the start of the startup power supply, the battery management device 54 measures or estimates the SOC and SOH of the main battery 52 (step S20). Then, the battery management device 54 determines whether to supply power from the main battery 52 to the battery management device 54 and the power circuit 61 based on the measured or estimated SOC and SOH of the main battery 52. Specifically, if the SOC is equal to or above the threshold (YES in step S30) and the SOH is equal to or above the threshold (YES in step S40), the battery management device 54 allows power supply from the main battery 52 to each electrical component (step S50). On the other hand, if the SOC is below the threshold (NO in step S30), or if the SOC is equal to or above the threshold (YES in step S30) but the SOH is below the threshold (NO in step S40), the battery management device 54 prohibits power supply from the main battery 52 to each electrical component (step S60).

In this way, power is supplied to the battery management device 54 from the sub-battery 62 rather than from the main battery 52. The battery management device 54 is started up, and the state of the main battery 52 is checked by the battery management device 54 before supplying power from the main battery 52 to the battery management device 54 and the power circuit 61. This allows stable power to be supplied from the main battery 52 to the electrical components if there is no problem with the state of the main battery 52. By supplying stable power to the electrical components, it is possible to effectively prevent malfunctions of the electrical components that may occur due to insufficient power, for example.

Figure 7:
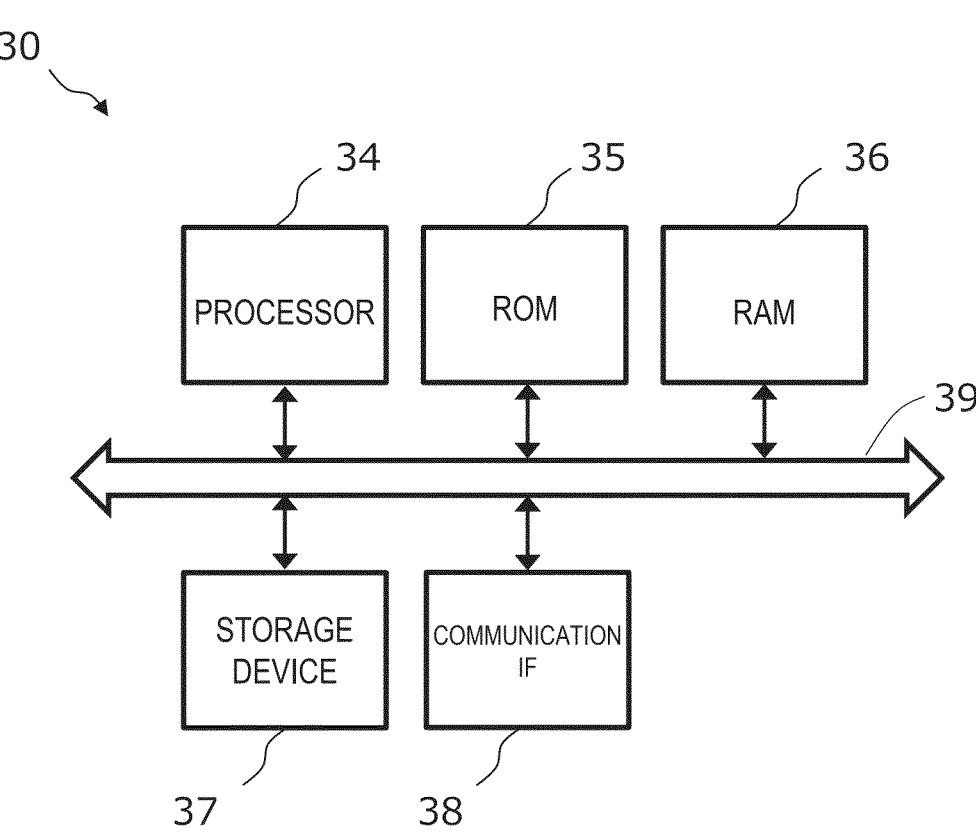
FIG. 7 is a block diagram showing an example of hardware configuration of a controller in the present example embodiment of the present invention.

FIG. 7 is a block diagram showing an example of hardware configuration of the controller 30. The controller 30 includes a processor 34, ROM (Read Only Memory) 35, RAM (Random Access Memory) 36, storage device 37, and communication I/F 38. These components are interconnected via a bus 39.

The processor 34 is one or more semiconductor integrated circuits, also referred to as a central processing unit (CPU) or microprocessor. The processor 34 sequentially executes computer programs stored in ROM 35 to implement the aforementioned processing. The term processor 34 is broadly interpreted to encompass devices such as FPGA (Field Programmable Gate Array) with CPU, GPU (Graphic Processor Unit), ASIC (Application Specific Integrated Circuit), or ASSP (Application Specific Standard Product).

The ROM 35 is, for example, a writable memory (for example, PROM), rewritable memory (for example, flash memory), or read-only memory. The ROM 35 stores programs that control the operation of the processor. The ROM 35 need not be a single recording medium but may be a collection of a plurality of recording media. Some of the plurality of collections may be removable memory.

The RAM 36 provides a work area for temporarily expanding programs stored in the ROM 35 during boot-up. The RAM 36 need not be a single recording medium but may be a collection of a plurality of recording media.

The communication I/F 38 is an interface for communication between the controller 30 and other electronic components or electronic controllers (ECUs). For example, the communication I/F 38 may perform wired communication complying with various protocols. The communication I/F 38 may perform wireless communication complying with Bluetooth® standards and/or Wi-Fi® standards. Both standards include wireless communication standards utilizing the 2.4 GHz frequency band.

The storage device 37 may be, for example, a semiconductor memory, magnetic storage device, or optical storage device, or a combination thereof. The storage device 37 is configured to store, for example, map data useful for autonomous flight of the multicopter 10, and various sensor data acquired by the multicopter 10 during flight.

Note that, as mentioned earlier, the controller 4a may be configured or programmed to include, for example, a flight controller such as a flight controller and a higher-level computer (companion computer). The companion computer may execute each process shown in FIG. 6 and provide commands related to power monitoring to the battery management device 54 based on the results of that processing. Additionally, one or more servers (computers) or terminal devices (including portable and fixed types) connected to the communication device 4c of the multicopter 100 via a communication network may execute some or all of the functions of the electrical components such as the controller 4a and battery management device 54 mounted on the multicopter 100.

Systems providing the various functions described in the example embodiments can also be retrofitted to multicopters that do not have those functions. Such systems can be manufactured and sold independently of the multicopters. Computer programs used in such systems can also be manufactured and sold independently of the multicopters. Computer programs may be provided stored on non-transitory computer-readable storage media, for example. Computer programs may also be provided through download via electrical communication lines (for example, the Internet).

Unmanned aerial vehicles according to example embodiments of the present disclosure may be widely utilized not only for aerial photography, surveying, logistics, and agricultural chemical spraying applications but also for ground work related to agriculture, transportation of harvested crops and agricultural materials.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An unmanned aerial vehicle comprising a plurality of rotors, the unmanned aerial vehicle comprising:

16 a power generator;
a first electrical component;
a second electrical component;
a main battery capable of being charged with power generated by the power generator;
a sub-battery;
an internal combustion engine; and
a charging circuit connecting the second electrical component and the sub-battery;
wherein the sub-battery is configured to be charged by receiving power from the second electrical component through the charging circuit, and configured to supply power to the first electrical component; wherein
the power generator is driven by the internal combustion engine to generate power; wherein
the first electrical component determines whether to supply the power from the main battery to the first and second electrical components according to a state of the main battery, in response to a start of the power supply from the sub-battery.

2. The unmanned aerial vehicle according to claim 1, further comprising a plurality of electric motors each configured to drive a respective one of a plurality of first rotors included in the plurality of rotors; wherein
the internal combustion engine is configured to drive at least one second rotor included in the plurality of rotors.

3. The unmanned aerial vehicle according to claim 1, further comprising a switching circuit to switch on or off the supply of power from the sub-battery to the first electrical component.

4. The unmanned aerial vehicle according to claim 3, wherein the switching circuit electrically connects the first electrical component and the sub-battery when starting up the first electrical component.

5. The unmanned aerial vehicle according to claim 1, wherein the second electrical component includes a power circuit to generate a stepped-down voltage by stepping down a battery voltage of the main battery; wherein
the sub-battery is electrically connected between an output terminal of the power circuit and ground; and
power is supplied to the sub-battery from the output terminal through the charging circuit.

6. The unmanned aerial vehicle according to claim 5, wherein a battery voltage of the sub-battery in a fully charged state is higher than a voltage output from the output terminal.

7. The unmanned aerial vehicle according to claim 5, wherein the charging circuit includes a resistor and a diode connected in series.

8. The unmanned aerial vehicle according to claim 7, wherein a resistance value of the resistor is about a dozen ohms.

* * * * *